United States Patent
Gennai

(10) Patent No.: US 12,433,450 B2
(45) Date of Patent: Oct. 7, 2025

(54) COFFEE BEAN GRINDER

(71) Applicant: Hemro International AG, Bachenbülach (CH)

(72) Inventor: Andrea Gennai, Milan (IT)

(73) Assignee: Hemro International AG, Bachenbülach (CH)

( * ) Notice: Subject to any disclaimer, the term of this patent is extended or adjusted under 35 U.S.C. 154(b) by 361 days.

(21) Appl. No.: 17/920,236

(22) PCT Filed: Apr. 13, 2021

(86) PCT No.: PCT/EP2021/059528
§ 371 (c)(1),
(2) Date: Oct. 20, 2022

(87) PCT Pub. No.: WO2021/213844
PCT Pub. Date: Oct. 28, 2021

(65) Prior Publication Data
US 2023/0157483 A1 May 25, 2023

(30) Foreign Application Priority Data
Apr. 21, 2020 (CH) .................................. 00469/20

(51) Int. Cl.
*A47J 42/44* (2006.01)
*A23F 5/08* (2006.01)
*A47J 42/40* (2006.01)

(52) U.S. Cl.
CPC .............. *A47J 42/44* (2013.01); *A23F 5/08* (2013.01); *A47J 42/40* (2013.01)

(58) Field of Classification Search
CPC ........................................................ A47J 42/44
See application file for complete search history.

(56) References Cited

U.S. PATENT DOCUMENTS 5,079,502 A * 1/1992 Rogacki ................ G01V 3/101
324/207.13
12,042,081 B2 * 7/2024 Doglioni Majer .... A47J 31/446
(Continued)

FOREIGN PATENT DOCUMENTS

DE 202019102316 U1 * 8/2019 .......... A47J 31/4492
EP 3 329 812 A1 6/2018
(Continued)

OTHER PUBLICATIONS

Translation of DE-202019102316 (Year: 2019).*
(Continued)

*Primary Examiner* — Bobby Yeonjin Kim
(74) *Attorney, Agent, or Firm* — Sughrue Mion, PLLC

(57) ABSTRACT

Coffee bean grinder (1) comprising at least one grinder module (4), at least one supply of coffee beans (2) as well as a ground coffee dispensing area (6) with a bracket (13), onto which are porta filter (9) to be filled with ground coffee is put for the process of dispensing ground coffee into said porta filter (9), wherein the coffee bean grinder (1) comprises a proximity sensor for detecting the presence of a porta filter (9) on said bracket (13), and wherein said proximity sensor is at least indirectly coupled to a grinder control unit (5), characterised in that said proximity sensor is a contactless proximity sensor (16).

16 Claims, 2 Drawing Sheets

(56) References Cited

U.S. PATENT DOCUMENTS

| | | | |
|---|---|---|---|
| 2009/0255409 A1* | 10/2009 | Marcotegui Goni | A47J 42/44 99/289 R |
| 2011/0094391 A1 | 4/2011 | Erba et al. | |
| 2016/0143481 A1 | 5/2016 | Merelli | |
| 2018/0153332 A1 | 6/2018 | Abbiati | |
| 2018/0153349 A1* | 6/2018 | Abbiati | A47J 31/404 |
| 2024/0065480 A1* | 2/2024 | Fiorani | A47J 31/42 |

FOREIGN PATENT DOCUMENTS

| | | |
|---|---|---|
| JP | 2018-108348 A | 7/2018 |
| WO | 2020049495 A1 | 3/2020 |
| WO | 2021/073972 A1 | 4/2021 |

OTHER PUBLICATIONS

International Search Report of PCT/EP2021/059528 dated May 14, 2021 [PCT/ISA/210].
Written Opinion of PCT/EP2021/059528 dated May 14, 2021 [PCT/ISA/237].
Anonymous: "Inductive sensor—Wikipedia", Apr. 6, 2020, XP055717742, Retrieved from the Internet: URL:https://en.wikipedia.org/wiki/Inductive_sensor [retrieved on Jul. 23, 2020].
Communication issued Jul. 30, 2024 in Japanese Application No. 2022-563865.

* cited by examiner

COFFEE BEAN GRINDER

CROSS REFERENCE TO RELATED APPLICATIONS

This application is a National Stage of International Application No. PCT/EP2021/059528, filed Apr. 13, 2021, claiming priority to Swiss Patent Application No. 00469/20, filed Apr. 21, 2020.

TECHNICAL FIELD

The present invention relates to an improved coffee bean grinder as well as to a method for operating a coffee bean grinder and a method for upgrading an existing prior art coffee bean grinder.

PRIOR ART

The coffee brewing process starting out from coffee beans involves the steps of grinding the coffee beans and subsequently extracting the coffee from the ground coffee beans by feeding a preset amount of hot water into a corresponding brewing chamber.

Coffee bean grinders, in particular if used in a professional environment, are highly specialised high-performance devices which need to produce, as quickly as possible, a desired freshly ground amount of coffee to be dispensed into a porta filter. The porta filter is subsequently used in the actual coffee machine for the brewing process. In order to be able to produce the ground coffee as quickly and as reliably as possible, modern coffee bean grinders are highly automated devices which are electronically controlled, i.e. which control the grinding process as a function of the input of the user and/or as a function of the automatically detected quality of the coffee beans, et cetera.

One of the problems associated with coffee bean grinders is that due to the intensive use and due to the ground coffee produced there is a high wear of the mechanical components, and this includes essentially any of the components which are directly or indirectly exposed to the outside, or exposed to the coffee beans and/or the ground coffee.

DE202019102316U1 relates to a coffee grinder comprising: a body comprising an inlet for introducing coffee beans into the body and an outlet for dispensing ground coffee from the body; a grinder group arranged in the body to grind the coffee beans; drive units connected to the grinder to move the grinder; a control unit, which is connected to the drive unit in order to send a start/stop command signal to the drive units; a carrier element for supporting a filter carrier so that the filter carrier is located below the outlet; a load cell which is connected to the carrier element in order to weigh the filter carrier; wherein the load cell is connected to the control unit in order to send to the control unit a weight signal which indicates the weight of the filter support; a proximity sensor for detecting the presence of the filter support on the carrier element.

US-A-2016143481 relates to a coffee grinding machine with a dispensing duct connected to a grinder unit to dispense coffee inside a filter supported by a filter-holder. The filter-holder is disposed above a support platform connected to a load cell that weighs the quantity of ground coffee contained in the filter and sends an indicative weight value of the ground coffee contained in the filter to a control unit in such manner to stop the grinder unit when the weight of the ground coffee contained in the filter—is equal to one dose. The load cell is inside a support frame that contains the grinder unit and an electric motor used to actuate the grinder unit.

SUMMARY OF THE INVENTION

It is thus an object of the present invention to propose an improved coffee bean grinder device which is more reliable, and which allows to very quickly and consistently produce ground coffee in particular in a professional environment. The aim is to provide for a device which requires as little as possible maintenance and which is controlled as consistently as possible.

Accordingly the present invention proposes an improvement to a coffee bean grinder comprising at least one grinder module, at least one supply of coffee beans as well as a ground coffee dispensing area with a bracket, onto which are porta filter to be filled with ground coffee is put for the process of dispensing ground coffee into said porta filter.

Known conventional coffee bean grinders are triggered either manually by the barrista once the porta filter is put on the bracket, or there is a mechanical proximity sensor in the form of a pushbutton located on the bracket or in the bracket or at a wall portion of the coffee bean grinder, said pushbutton being activated by contact with the porta filter. So these models of coffee bean grinders comprise a proximity sensor for detecting the presence of a porta filter on said bracket, and said proximity sensor is at least indirectly coupled to a grinder control unit. For example the proximity sensor mechanical switch is used to trigger and launch the actual grinding process automatically.

It has now been found that the problem with these mechanical switches is that due to the presence of moving parts, their reliability is insufficient. Dirt, in particular the fine parts of the ground coffee, enter into slots between moving parts and, upon continued and intensive use lead to malfunctioning or even complete failure of the corresponding mechanical switches. Another problem is that upon intensive use of the porta filter the metal part thereof may reach very high temperatures, potentially harming the mechanical switch upon contacting it, and also in intensive use operators may shift the porta filter roughly into the corresponding bracket leading to simply mechanical damage of the mechanical switch.

The result is that the grinding process is not reliably activated after a certain time, or is not activated at all due to complete failure of the mechanical switch. This leads to increased maintenance expenses and corresponding downtime of the coffee bean grinders. Very often, these mechanical switches have to be cleaned or even have to be replaced. According to the invention therefore these mechanical proximity contact sensors are replaced by a contactless proximity sensor. It was found that indeed using contactless proximity sensors in this field essentially solves all the problems, since contactless proximity sensors do not contain moving mechanical parts and can be housed in a corresponding housing or can be located within the coffee bean grinder housing behind a wall thereof. Further using contactless proximity sensors opens up new perspectives for controlling coffee bean grinder devices.

Contactless proximity sensors, in contrast to mechanical proximity sensors, can provide information not only about the presence of the porta filter, but also about the proper positioning of the porta filter and/or the type of the porta filter, since contactless proximity sensors do not simply provide a yes or no signal like mechanical switches, they basically measure how an object penetrates into the sensing field. Therefore contactless proximity sensors make available a wealth of parameters for control, and can for example be used to identify whether a proper and approved porta filter is used and may be used to deny grinding if the wrong porta filter is used, or may be used to identify a certain type of porta filter and to then initiate a corresponding grinding process (type of grinding, amount of ground coffee, et cetera) suitable and adapted to this type of porta filter. Furthermore such a proximity sensor allows to detect whether the porta filter is not only present but also is properly positioned below a corresponding conduit delivering the ground coffee, and may be used to control the grinding process in the sense that if the porta filter is not properly positioned a warning is issued to the operator.

According to a preferred embodiment, the contactless proximity sensor can be an ultrasonic sensor, a capacitive sensor, a photoelectric sensor (e.g. similar to a light barrier), an electronic image sensor (CMOS and CCD), a laser distance sensor, or sensor based on magnetic field effects (inductive sensor). Also, the sensor can be sensor making use of a combination of these sensing mechanisms.

The sensors can preferably sense not only the presence of a porta filter but can also be used for identification of the type of porta filter (e.g. by detecting at least one of the form, material, reflection, identification means like barcode or QR code or passive/active transponder (e.g. Near Field Communication (NFC)), of the status of the porta filter (degree of filling, way of positioning, et cetera).

Typically, the coffee bean grinder does not comprise a load cell to detect the weight of the porta filter, control in relation with the porta filter is only effected using the contactless proximity sensor.

According to a first preferred embodiment, said contactless proximity sensor is a sensor for detecting metal objects. This can very efficiently be used for safety reasons, preventing the grinding process to actually be triggered if a non-metal object is approaching, porta filters on the hand, normally being metal-based, will be recognised.

Said contactless proximity sensor is preferably a sensor generating a magnetic field, and is preferably sensing the perturbation of said magnetic field upon entry of at least part of the porta filter into said magnetic field. For example this is done by detecting a change of the current and/or voltage supplied (or a change in a resistance or a change in impedance or in power consumption) to a magnetic field generating electrical or electronic part, preferably in the form of a coil.

Said contactless proximity sensor may for example comprise a magnetic field-generating coil, which is at least partially or preferably several times wound around a core, preferably a Ferrite core.

Said contactless proximity sensor preferably has a nominal sensing distance (Sn) in the range of 2-10 mm, preferably in the range of 3-5 mm.

The contactless proximity sensor typically is located at a rear wall portion of the ground coffee dispensing area of the coffee bean grinder, and preferably essentially at a height which corresponds to the height of a circumferential wall of a porta filter put on said bracket. However the contactless proximity sensor may also be incorporated into said bracket, or it may be located below the porta filter. It may also be located above the porta filter and for example next to a conduit used for dispensing the ground coffee into the porta filter. It may furthermore be located at or incorporated in such a conduit.

Such a contactless proximity sensor is further preferably located in a separate housing which can for example be mounted on a rear wall portion of the ground coffee dispensing area at a height which preferably corresponds to the height of the circumferential wall of a porta filter put on said bracket.

Preferably such a housing of the contactless proximity sensor houses a printed circuit board and sensing field generating element. Such a housing may be put either behind a wall of the coffee bean grinder housing, or it may be embedded in such a housing, but it may also be put on the surface of such a coffee bean grinder housing, the wiring of the sensor penetrating through a small hole in the coffee bean grinder housing.

The elements in such a housing or preferably enclosed or embedded in a dirt and/or waterproof manner, preferably by being embedded in a potting.

As pointed out above, normally and preferably the contactless proximity sensor is able to detect different types of porta filter and/or the way of and appropriateness positioning of the porta filter and to trigger a sensing signal allowing the grinder control unit to distinguish these different types and to use that distinction for control purposes or to issue a warning signal in case of improper positioning or improper loading or improper type of porta filter. This detection can take the form of at least one of the following environments:

scanning (e.g. optical, magnetic, electromagnetic field, et cetera) of a corresponding code embedded in or located on the porta filter identifying the porta filter either individually or in terms of its type (can be barcode, QR code, passive or active transponder, text, numbers, or combinations thereof, and may involve optical character recognition;

recognition of the type of porta filter by way of particular sensor feedback, e.g. by the type of signal of the capacitive and/or magnetic and/or optical sensor;

geometrical recognition (image recognition), which can be implemented in the form of a two-dimensional recognition (silhouette or section recognition) or in the form of a three-dimensional form recognition;

weight and volumetric recognition of the porta filter.

As pointed out, this more elaborate sensing can be used for control and/or monitoring and/or interaction with the user, for example involving individualised tracking and bookkeeping and/or accounting, involving issuance of warnings and/or user instructions depending on the detected porta filter, porta filter filling, porta filter status et cetera, directly controlling the machine as a function of the detected porta filter and initiating further action.

These methods may involve pre-programming of porta filter characteristics into a library in the machine or, if the machine is attached to the Internet or another external database, establishing a link to corresponding libraries available by the Internet or an external database.

Furthermore the present invention relates to a method of operation of such a grinder as described above. Preferably, according to that method said contactless proximity sensor, upon detection of a porta filter, triggers a signal transmitted to the grinder control unit, which signal is preferably used by the grinder control unit to initiate the grinding process and/or to release ground coffee from an intermediate storage container into said porta filter. The signal may also be used to initiate a corresponding dialogue with the operator by means of an interface on the coffee bean grinder, for example to trigger the selection process for the grinding quality.

The signal of the contactless proximity sensor preferably is able to discriminate between different types of porta filter. Preferably, using that discrimination, the grinder control unit controls the grinding process, in particular in terms of at least one of the following parameters: time of grinding, width of the grinding slot, weight of ground coffee, type of coffee supply to the grinder, grinder speed, or a combination thereof.

Furthermore the present invention relates to a method for upgrading coffee bean grinder comprising at least one grinder module, at least one supply of coffee beans as well as a ground coffee dispensing area with a bracket, onto which a porta filter to be filled with ground coffee is put for the process of dispensing ground coffee into said porta filter. The coffee bean grinder comprises a proximity sensor for detecting the presence of a porta filter on said bracket, and said proximity sensor is at least indirectly coupled to a grinder control unit. According to the proposed upgrading process, said mechanical proximity sensor is replaced by a contactless proximity sensor which is preferably located in a separate housing, preferably to be mounted on a rear wall portion of the ground coffee dispensing area at a height which corresponds to the height of the circumferential wall of a porta filter put on said bracket.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
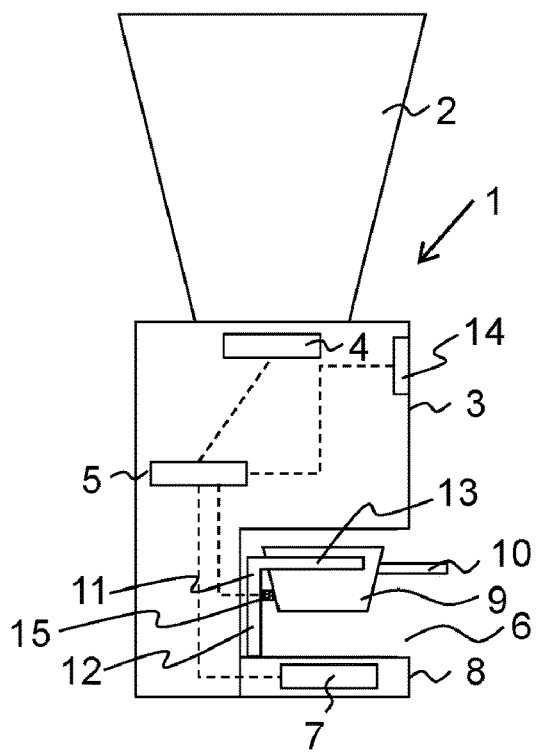
FIG. 1 shows a schematic drawing of a coffee bean grinder in a side view according to the prior art.

FIG. 1 schematically represents a prior art coffee bean grinder 1 in a side view. On top there is a coffee bean container 2 comprising the coffee beans. By gravity the coffee beans in that coffee bean container 2 are allowed to enter the actual grinder module 4 grinding the coffee beans to the desired coffee powder. A conduit (not illustrated) is then used to guide the ground coffee to a ground coffee dispensing area 6, which is typically a recessed area of the coffee bean grinder 1.

The coffee bean grinder 1 comprises a grinder control unit 5 as well as typically a user input/output device 14, for example in the form of display and push buttons, or a touchscreen, to interact with the operator of the machine. Furthermore, in this embodiment there is provided a load cell 7 in a separate foot portion 8, and this load cell is a weight sensor which is used to control the amount of ground coffee dispensed into the porta filter 9. Dashed lines illustrate signal and control wiring between corresponding elements, so the grinder control unit is connected to and interacting controllably with the grinder module 4 as well as with the user input/output device. Furthermore it interacts with the load cell 7 by receiving corresponding weight signal and using it for controlling the grinding and/or dispensing process. Furthermore, the device includes power supply elements for supplying power to the control elements as well as the operating elements, indicator lights et cetera, with corresponding wiring, these additional elements are not specifically illustrated and are known to the skilled person.

The porta filter 9 comprises a handle 10, which is manipulated by the operator, by way of this handle 10 the porta filter is attached to the actual brewing module of a coffee brewing machine in the typical shift and twist motion. The handle 10 in case of manipulation of the coffee bean grinder 1 is used for putting the porta filter 9 onto the porta filter support 11. In this case the porta filter support 11 has a vertical member 12 which rests on the foot portion 8 to allow for weight measurement, and a horizontal bracket 13. Normally the porta filter 9 enters between two arms of this horizontal bracket 13 to rest on them during the grinding and dispensing process.

Furthermore, this prior art coffee bean grinder 1 is equipped with a mechanical proximity sensor 15, typically in the form of a mechanical pushbutton. This mechanical proximity sensor 15 is located on a rear wall of the ground coffee dispensing area 6 and at a vertical height such that when putting the porta filter 9 on the bracket 13 the mechanical proximity sensor is pressed, and a corresponding signal is delivered to the grinder control unit 5 for example for initiating a corresponding display on the user input/output device 14.

Figure 2:
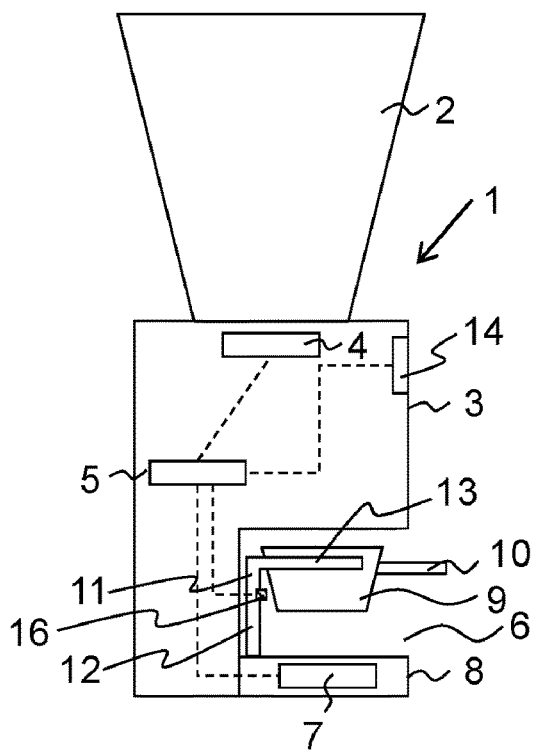
FIG. 2 shows a schematic drawing of a coffee bean grinder in a side view according to the invention.

FIG. 2 represents an analogous schematic representation, however this time not with a prior art proximity sensor, but with a contactless proximity sensor 16. As one can see this contactless proximity sensor 16 is not contacting the porta filter 9 and is at a safe distance therefrom.

Figure 3:
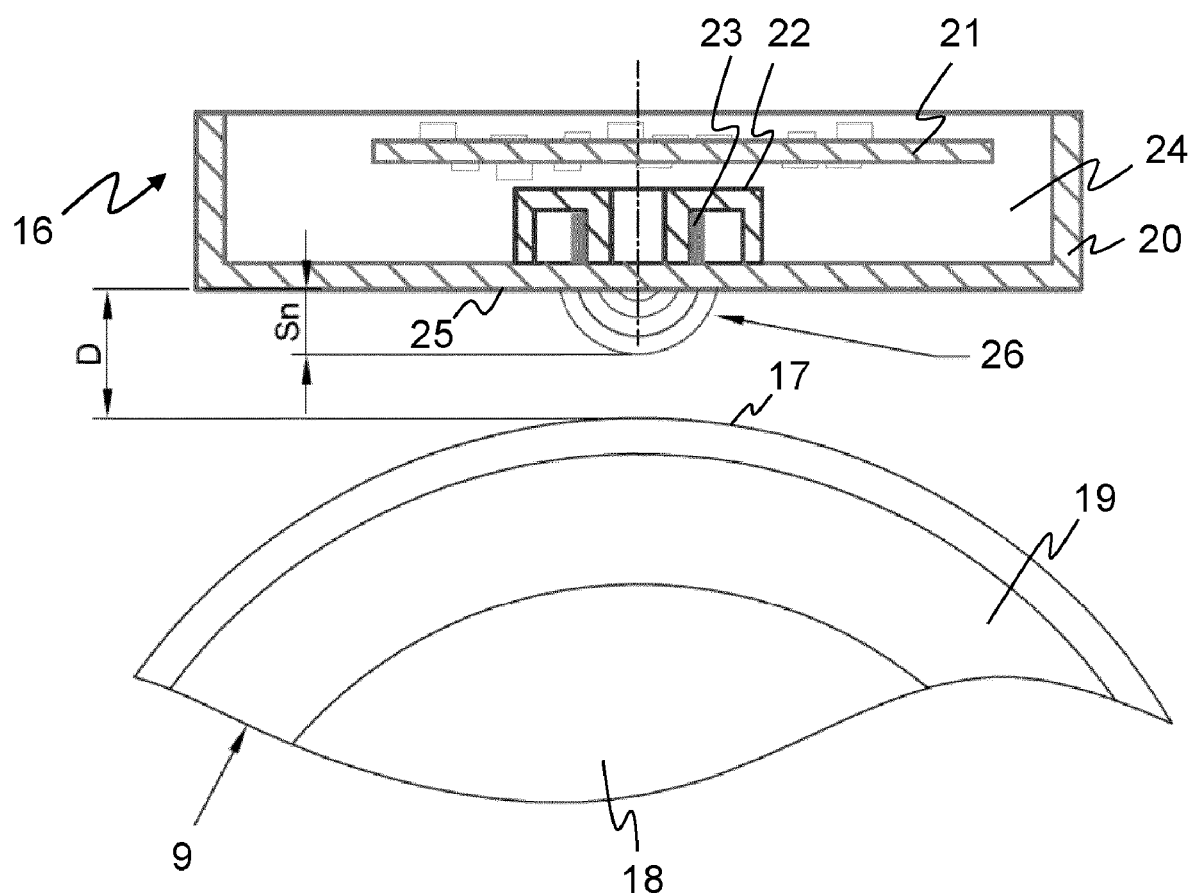
FIG. 3 shows in a horizontal cut the contactless proximity sensor and an approaching porta filter.

FIG. 3 shows the details of a possible contactless proximity sensor 16, in a schematic horizontal cut through a machine according to FIG. 2. In this embodiment, the proximity sensor 16 is located in a housing 20 which is mounted in or on the rear wall of the above-mentioned ground coffee dispensing area, essentially at a height of the porta filter 9. In this housing there is located a printed circuit board 21 which is signal-wired to the grinder control unit 5 (wiring not illustrated here). It may furthermore be wired to a power supply line. The printed circuit board may also contain intelligence itself, in particular if the corresponding sensor is used for repowering or upgrading of existing machines, in the sense that the signal generated by the actual sensing elements is processed, for example to either generate just a yes/no signal, or, as preferred, to generate information about the porta filter, for example about the type of the porta filter, the positioning of the porta filter, et cetera, to be delivered to the grinder control unit.

In this particular case, the contactless proximity sensor is in the form of a magnetic sensor. The actual sensing elements comprise a Ferrite core 22, a section of which comprises a coil wiring 23. The core may be permanently magnetised and the coil be used simply for detection of a disturbance in the magnetic field, or the core may be magnetised by the coil and the disturbance in the magnetic field is then detected by a change in the drive current and/or voltage in the coil. The components within that housing 20 are embedded in a potting 24, which makes this sensor element 16 as a whole and element which can be easily used for upgrading an existing machine.

Switched on, the sensor produces a magnetic field which is schematically illustrated by way of the field lines 26. The porta filter 9, comprising the perforated filter plate 18 and a metal circumferential wall section 19, approaching the sensor 16, in the representation at a distance D not triggering the sensor, if approaching further will reach the sensing distance at a certain moment, and at this sensing distance the contactless proximity sensor will generate a corresponding signal and transmit it to the grinder control unit. Preferably, such a sensor has a nominal sensing distance Sn of 3.5 mm, the real sensing distance normally varying in a range of ±10% around that value. The hysteresis is preferably less than 10% of the real sensing distance. Such a sensor can work with the supply voltage of 5 V with a no-load supply current of less than 10 mA. The maximum thermal drift of the real sensing distance should be less than 10% and the switching frequency should be in the range of 1 kHz.

LIST OF REFERENCE SIGNS

| | |
|---|---|
| 1 | coffee bean grinder |
| 2 | coffee bean container |
| 3 | housing of 1 |
| 4 | grinder module |
| 5 | grinder control unit |
| 6 | ground coffee dispensing area |
| 7 | load cell |
| 8 | separate foot portion of 1 |
| 9 | porta filter |
| 10 | handle of 9 |
| 11 | porta filter support |
| 12 | vertical member of 11 |
| 13 | bracket member of 11 |
| 14 | user input/output device |
| 15 | mechanical proximity sensor |
| 16 | contact-less proximity sensor |
| 17 | back side wall portion of 9 |
| 18 | perforated filter plate of 9 |
| 19 | circumferential wall section of 9 |
| 20 | housing of 16 |
| 21 | printed circuit board |
| 22 | Ferrite core |
| 23 | coil |
| 24 | potting |
| 25 | front surface of 20 |
| 26 | schematic field lines of magnetic field |
| D | distance from porta filter |
| Sn | nominal sensing distance |

The invention claimed is:

1. A coffee bean grinder comprising at least one grinder module, at least one supply of coffee beans as well as a ground coffee dispensing area with a bracket, onto which are porta filter to be filled with ground coffee is put for the process of dispensing ground coffee into said porta filter, wherein the coffee bean grinder comprises a proximity sensor for detecting the presence of a porta filter on said bracket, and wherein said proximity sensor is at least indirectly coupled to a grinder control unit,
wherein said proximity sensor is a contactless proximity sensor;
wherein said contactless proximity sensor is located at a rear wall portion of the ground coffee dispensing area, or is incorporated into said bracket, or is located above the porta filter,
wherein said contactless proximity sensor is a contactless proximity sensor for detecting metal objects and is a contactless proximity sensor generating a magnetic field, sensing the perturbation of said magnetic field upon entry of at least part of the porta filter into said magnetic field, and
wherein the contactless proximity sensor is able to detect different types of porta filter and/or the way of and appropriateness of positioning of the porta filter and to trigger a sensing signal allowing the grinder control unit to distinguish these different types and to use that distinction for control purposes or to issue a warning signal in case of improper positioning or improper loading or improper type of porta filter.

2. The grinder according to claim 1, wherein said contactless proximity sensor comprises a magnetic field-generating coil which is at least partially wound around a core.

3. The grinder according to claim 1, wherein said contactless proximity sensor has a nominal sensing distance (Sn) in the range of 2-10 mm.

4. The grinder according to claim 1, wherein said contactless proximity sensor is located in a separate housing which can be mounted on a rear wall portion of the ground coffee dispensing area at a height which corresponds to the height of the circumferential wall of a porta filter put on said bracket.

5. The grinder according to claim 4, wherein said contactless proximity sensor and, when present, further elements in said housing are embedded in a dirt and/or waterproof manner.

6. A method for operating a grinder according to claim 1, wherein said contactless proximity sensor, upon detection of a porta filter, triggers a signal transmitted to the grinder control unit.

7. The method according to claim 6, wherein the signal of the proximity sensor is used by the grinder control unit to initiate the grinding process and/or to release ground coffee from an intermediate storage container into said porta filter.

8. The method according to claim 6, wherein the signal of the contactless proximity sensor discriminates between different types of porta filter, and wherein the grinder control unit controls the grinding process.

9. A method for upgrading coffee bean grinder comprising at least one grinder module, at least one supply of coffee beans as well as a ground coffee dispensing area with a bracket, onto which a porta filter to be filled with ground coffee is put for the process of dispensing ground coffee into said porta filter, said coffee bean grinder comprising a proximity sensor for detecting the presence of a porta filter on said bracket, and wherein said proximity sensor is at least indirectly coupled to a grinder control unit, wherein said proximity sensor is replaced by a contactless proximity sensor; and
wherein said contactless proximity sensor is a contactless proximity sensor for detecting metal objects and is a contactless proximity sensor generating a magnetic field, sensing the perturbation of said magnetic field upon entry of at least part of the porta filter into said magnetic field.

10. The method for upgrading coffee bean grinder according to claim 9, wherein said proximity sensor is located in a separate housing.

11. The grinder according to claim 1, wherein said contactless proximity sensor comprises a magnetic field-generating coil which is at least partially wound around a Ferrite core.

12. The grinder according to claim 1, wherein said contactless proximity sensor has a nominal sensing distance (Sn) in the range of 3-5 mm.

13. The grinder according to claim 1, wherein said contactless proximity sensor is located in a separate housing which can be mounted on a rear wall portion of the ground coffee dispensing area at a height which corresponds to the height of the circumferential wall of a porta filter put on said bracket, and wherein said housing houses a printed circuit board and said contactless proximity sensor.

14. The grinder according to claim 4, wherein said contactless proximity sensor and, when present, further elements in said housing are embedded in a dirt and/or waterproof manner by being embedded in a potting.

15. The method according to claim 6, wherein the signal of the contactless proximity sensor discriminates between different types of porta filter, and wherein the grinder control unit controls the grinding process, in terms of at least one of the following parameters: time of grinding, width of the grinding slot, weight of ground coffee, type of coffee supply to the grinder, grinder speed, or a combination thereof.

16. The method for upgrading coffee bean grinder according to claim 9, wherein said proximity sensor is located in a separate housing, to be mounted on a rear wall portion of the ground coffee dispensing area at a height which corresponds to the height of the circumferential wall of a porta filter put on said bracket.

* * * * *